United States Patent [19]

Lee

[11] 4,025,978

[45] May 31, 1977

[54] FEEDING DEVICE FOR MULTI-HEADED RADIAL TYPE NUT TAPPERS

[76] Inventor: Yuan Ho Lee, 85, Jen Ho Road, Tainan, China /Taiwan

[22] Filed: Mar. 3, 1976

[21] Appl. No.: 663,504

[52] U.S. Cl. .......................... 10/130 WH; 10/165; 408/43

[51] Int. Cl.² ..................... B23G 1/20; B23G 11/00

[58] Field of Search ... 10/129 WH, 129 WJ, 130 R, 10/130 WH, 132, 139 WH, 139 WJ, 165; 221/175, 186, 190; 408/43, 48, 49

[56] References Cited

UNITED STATES PATENTS

| 462,243 | 11/1891 | Egge | 221/175 |
|---|---|---|---|
| 478,597 | 7/1892 | Hardman | 221/175 |
| 604,447 | 5/1898 | Weiss | 408/43 |
| 1,254,709 | 1/1918 | Levinger et al. | 10/129 WJ |
| 2,203,287 | 6/1940 | Smith | 10/165 |
| 2,249,758 | 7/1941 | Goldberg | 10/139 WH |
| 2,714,213 | 8/1955 | Holzer | 408/43 |

FOREIGN PATENTS OR APPLICATIONS

| 429,392 | 5/1926 | Germany | 10/130 WH |

*Primary Examiner*—E. M. Combs
*Attorney, Agent, or Firm*—Lane, Aitken, Dunner & Ziems

[57] ABSTRACT

A feeding device for multi-headed radial type nut tappers. The device includes a drum having a plurality of sliding guides provided on the exterior walls thereof, and a rotary hopper provided around the upper periphery thereof, and coaxial therewith. The hopper is rotated around its axis for the purpose of feeding nut blanks into the sliding guides from where they are fed to the front of the tapping heads of the nut tapper.

3 Claims, 5 Drawing Figures

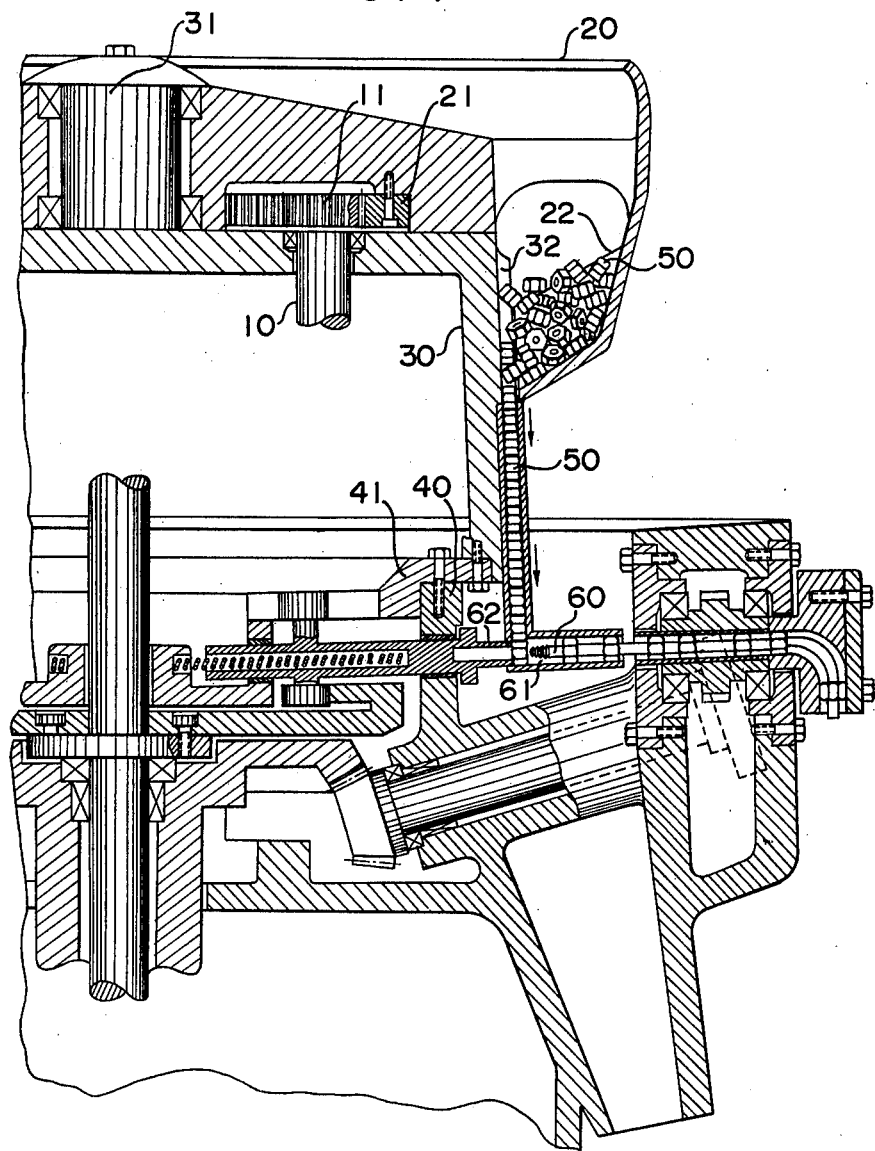
FIG. I

FEEDING DEVICE FOR MULTI-HEADED RADIAL TYPE NUT TAPPERS

BACKGROUND OF THE INVENTION

Conventional nut blank feeding devices consist mainly of one or two sliding guides provided with rocker vanes for the purpose of pushing nut blanks into a sliding guide. The construction of this and other types of conventional feeding devices is such that a relatively large space is taken up by the feeding device itself. Furthermore, the conventional feeding device is quite susceptible to clogging. In addition, the conventional devices are not adaptable for use with a radial type nut tapper having a large number of tapping heads.

The multiheaded radial type nut tapper for which the present invention is intended is the subject matter of a copending application by the same inventor under Ser. No. 644,941.

The main purpose of this invention is to overcome the above-mentioned defects and to provide a feeding device that is suitable for use with a radial type, multi-headed nut tapper which is relatively unsusceptable to clogging, so to introduce a device which will raise the efficiency of a single feeder to that of a plurality of conventional devices.

BRIEF DESCRIPTION OF THE DRAWINGS

Other objects and advantages of the present invention over conventional devices will become more apparant as the invention is explained with reference to the appended drawings, wherein:

FIG. 1 is a plan view in partial secton of a first embodiment of a feeding device according to the present invention;

DETAILED DESCRIPTION OF THE DRAWINGS

Figure 3:
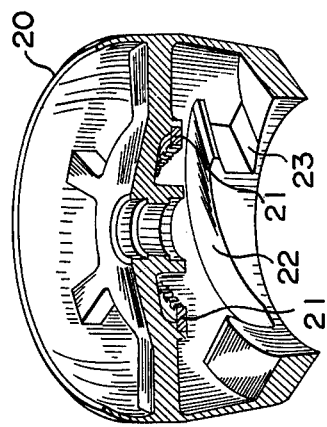
FIG. 3 is a view in cross section of a hopper according to a preferred embodiment of the present invention.
Figure 2:
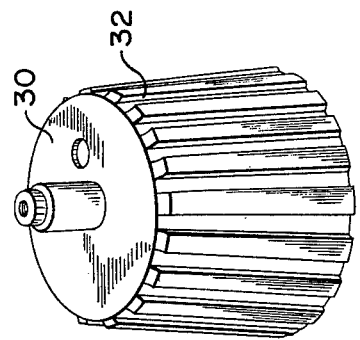
FIG. 2 is a perspective view of a drum and slide guides thereof.

As shown in FIGS. 1 and 2, a preferred embodiment of the present invention consists of a pinion 11 provided on one end of a driving shaft 10 and meshed with a ring gear 21, which is provided internally of a rotary hopper 20. The rotary hopper 20 is pivotally connected to a stationary shaft 31 which is in turn affixed to a tapered drum 30. The tapered drum 30 is provided with a plurality of sliding guides 32-32 on the external walls thereof and is secured by suitable means to a stationary roller guide plate 41 which in turn is secured to the machine frame 40 to become an integral part thereof.

According to a preferred embodiment of the present invention, when the driving shaft 10 is driven, it will drive the pinion 11 to drive the ring gear 21, thereby causing the hopper 20 to rotate, churning the nut blanks 50—50 therein. When a nut blank 50 is churned into alignment with one of the sliding guides 32—32, the motion of the hopper will cause it to fall into the sliding guide 32 immediately where it will drop to a position in front of a tapping guideway 61 where it will be pushed through by a tapping rod 62 to be tapped by a tapping head 60. If a nut blank 50 is not in proper alignment to be introduced into a sliding guide 32, it will be lifted along an inclined guide vane 22 as it is churned by the other blanks into alignment. Otherwise, it will be lifted along the guide vane 22 away from the sliding guide 32 as another, properly aligned nut blank 50 enters the sliding guide. As the nut blanks located in a recessed tray 23 at the bottom of the guide vane 22 have a greatly increased chance of being properly introduced into a sliding guide, under low speed rotation of the hopper 20, nut blanks will be fed in a continuous manner into the sliding guides 32 to achieve the desired results.

Figure 4:
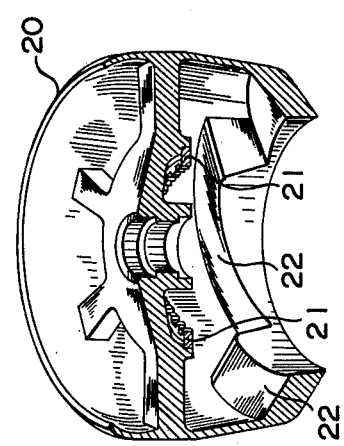
FIG. 4 is a cross sectional view of the hopper of a second embodiment according to the present invention.

As shown in FIG. 4, a second embodiment of the rotary hopper 20 is basically the same as described above, except that there is no recessed tray provided at the bottom of the guide vanes 22—22. The operational principle is the same as above. However, due to the absence of the recessed tray, the efficiency will be somewhat lower than that of the previously described embodiment. Due to the guiding vanes, the device will still be unlikely to cause clogging of nut blanks in the sliding guides.

Figure 5:
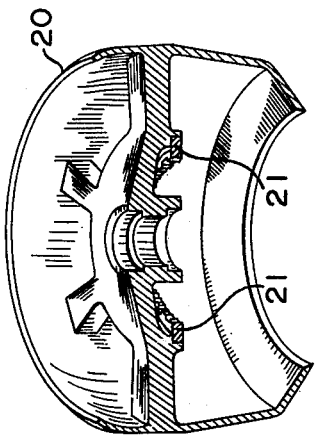
FIG. 5 is a cross sectional view of the hopper of a third embodiment according to the present invention.

A third embodiment is shown in FIG. 5. As can be seen, the basic construction is the same as the previous embodiments, except that in this embodiment the hopper is provided with neither recessed tray nor inclined vanes. It will be obvious that the efficiency of this embodiment will be lower than either of the previous embodiments.

What I claim is:

1. A feeding device for a multiheaded radial type nut tapper which includes tapping guideways for continuously receiving nut blanks, said feeding device comprising:

a stationary drum member secured by suitable means to the body of a nut tapper, said drum member defining a plurality of guide grooves thereon extending substantially along the length of the drum member for guiding nut blanks therealong when properly aligned therewith;

a rotary hopper member coaxially and rotatably connected to an upper portion of said drum member and structurally cooperating with said drum member for continuously moving, when rotating, nut blanks into said guide grooves of said drum member;

means for driving said hopper member in a continuous rotary motion about its axis to distribute nut blanks into alignment with the guide grooves of said drum member in such a manner that, at every rotation of said hopper member about its axis, a plurality of nut blanks will be introduced into a plurality of said guide grooves on the drum to feed each nut blank to a suitable position at the front of one of a plurality of tapping guideways provided within a nut tapper to receive said nut blanks from said drum member, thereby to feed nut blanks to said nut tapper in a continuous manner.

2. The feeding device as set forth in claim 1, further including a plurality of guide vanes located internally of the rotary hopper member and structurally cooperating therewith for lifting nut blanks which are not aligned with one of said guide grooves along one of said guide vanes to be churned into alignment by other nut blanks.

3. The feeding device as set forth in claim 2, further including a recessed tray located adjacent the uppermost end of one guide vane and the lowermost end of an adjacent guide vane along the interior periphery of said tapper member for receiving nut blanks therein for introduction in proper alignment into one of said guide grooves.

* * * * *